United States Patent
Schmidt et al.

[11] 3,909,124
[45] Sept. 30, 1975

[54] PROJECTION CONTROL CIRCUIT

[75] Inventors: Peter Schmidt; Karl-Heinz Häberle, both of Stuttgart, Germany

[73] Assignee: Eastman Kodak Company, Rochester, N.Y.

[22] Filed: May 22, 1972

[21] Appl. No.: 255,847

[30] Foreign Application Priority Data
Sept. 9, 1971 Germany............................ 2145100
Sept. 9, 1971 Germany...................... 7134351[U]

[52] U.S. Cl. ........................ 353/86; 353/90; 353/94
[51] Int. Cl.² ......................................... G03B 23/16
[58] Field of Search ............. 353/83, 86, 90, 91, 92, 353/93, 94

[56] References Cited
UNITED STATES PATENTS
1,365,752  1/1921  Vischer................................ 353/90
3,161,109  12/1964  Cavillo................................ 353/86
3,689,140  9/1972  Harvey................................ 353/90

Primary Examiner—Richard E. Aegerter
Assistant Examiner—A. J. Mirabito
Attorney, Agent, or Firm—J. L. Palmer

[57] ABSTRACT

A change-over control circuit for controlling change-over operation between two projectors during either forward or reverse magazine operation, which includes first circuit means for providing a change-over cycle which precedes magazine transport during forward magazine operation and includes a second circuit means which provides a change-over cycle that follows magazine transport during reverse magazine operation. The control circuit may include flip-flop circuit means actuatable by a forward transport actuator for providing a first signal which initiates the change-over cycle and for providing second and third signals which are used as inputs to AND-gate circuits. Upon simultaneous occurrence of the second and third signals, the forward magazine transport is energized. The flip-flop circuit and the closure of a reverse transport actuator provide simultaneous inputs to second AND-gate circuits which generate an output signal that energizes the reverse magazine transport. The output signal for reverse magazine operation is coupled to the input of the flip-flop circuit means and effects the change-over cycle at the end of the reverse magazine transport.

7 Claims, 1 Drawing Figure

U.S. Patent  Sept. 30, 1975  3,909,124
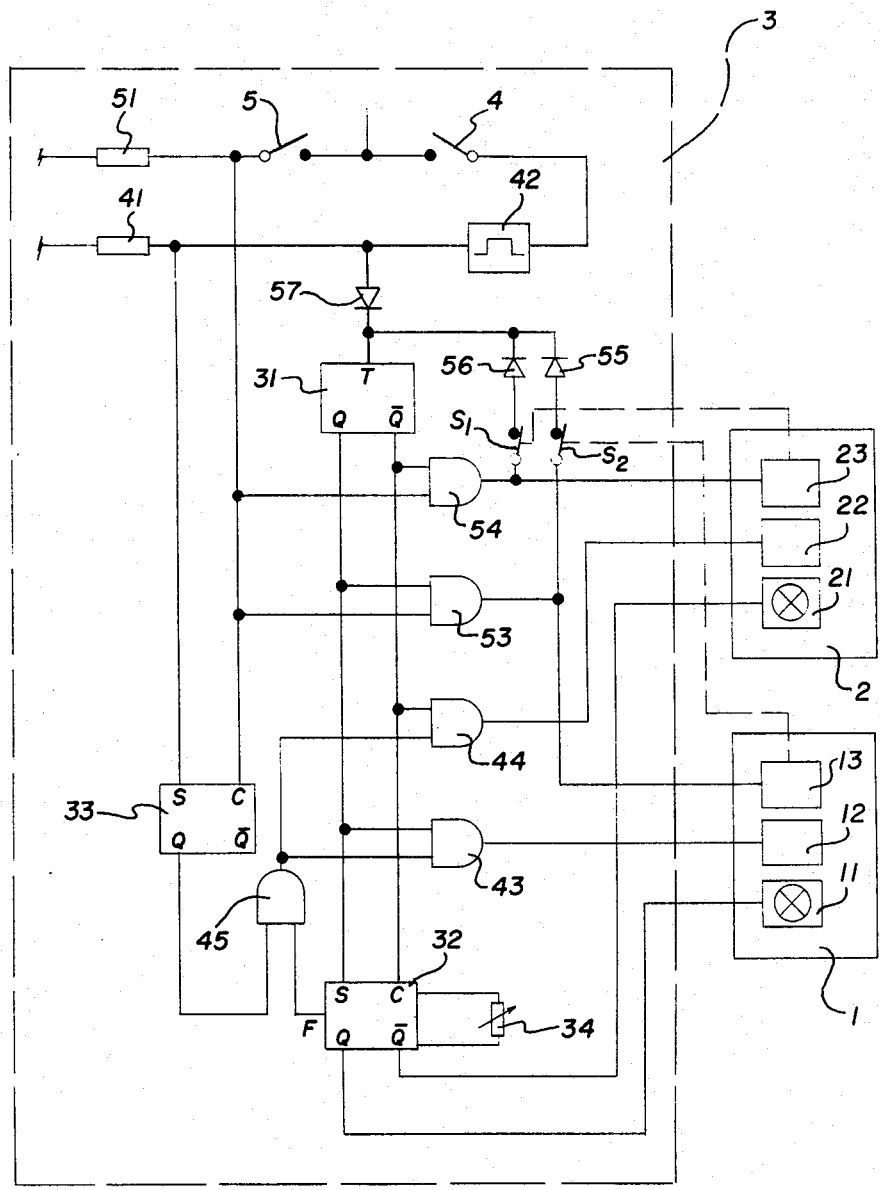

PROJECTION CONTROL CIRCUIT

BACKGROUND OF THE INVENTION

1. Field of the Invention

This invention relates to a control circuit for change-over projection during forward and reverse magazine travel between two projectors.

2. Discussion of the Prior Art

In change-over systems for projectors there are two basic approaches for change-over depending upon construction of the apparatus. A first construction comprises a special change-over projector combining in one housing, among other components, two projector lamps, two projection lenses, and two magazines. The other type utilizes two projectors of conventional construction, which are directed at a common screen and whose projector lamps and slide change mechanisms are alternately operated with the magazine transport by means of a control device, which in most cases is provided as a remote control device.

The construction which comprises two conventional projectors and remote control means has a disadvantage in that change-over is only possible when the slide magazine transport mechanism is set to forward travel; that is, the series cannot be shown in a backward order.

It is known to provide a method for projecting slides in reverse order and in a change-over cycle by means of a change-over projector having a control cam disc which cooperates with gang switches to control the function of the change-over operation. However, the utilization of this system for controlling change-over operation during forward and reverse travel of the magazine is restricted to a specific change-over type projector and cannot be used for change-over operation with conventional projectors.

SUMMARY OF THE INVENTION

It is therefore an object of the invention to provide a control system for change-over operation of projectors when magazine transport is either set for forward or for reverse movement.

In accordance with one illustrative embodiment of the invention a change-over control system is provided for change-over operation of projectors during forward or reverse magazine travel which includes first circuit means for providing a change-over cycle which precedes magazine transport during forward travel and includes second circuit means which provides the change-over cycle that follows the magazine transport during reverse travel. The control circuit may include flip-flop circuit means actuatable by a forward transport actuator for providing a first signal which initiates the change-over cycle. The control circuit provides second and third signals to AND-gate circuit means for providing a signal for initiating the forward magazine transport upon simultaneous occurrence of the second and third signals. Second AND-gate circuit means are provided with simultaneous signals from the flip-flop circuit and from actuation of the reverse transport actuator for providing an output signal to the reverse magazine transport. The output signal from the second AND-gate circuit means is fed back to the input of the flip-flop circuit means and is interrupted at the end of reverse magazine travel. The interruption effects the change-over cycle at the end of reverse magazine transport.

BRIEF DESCRIPTION OF THE DRAWINGS

In the detailed description of the preferred embodiment of the invention presented herein, reference is made to the accompanying drawing which shows circuitry in logic diagram form for providing change-over projection between two projectors during both forward and reverse projector magazine travel.

DETAILED DESCRIPTION OF THE DRAWINGS

Slide projector systems are well known in the art, therefore, only those components of the control circuit which are necessary to give an understanding of the operation of the present invention are shown and described.

The construction of the change-over arrangement according to the present invention is described with reference to one illustrative embodiment comprising two projectors which are shown in block form and numerically designated as 1 and 2. The projectors include projection lamps 11 and 21 respectively, magazine transports 12 and 22 respectively for forward magazine transport, magazine transports 13 and 23 respectively for reverse magazine transport. It will be understood that the magazine transports of projectors 1 and 2 are of the conventional type which, upon actuation, remove a slide from the projector film gate, effects indexing movement of the slide tray to index a new slide and insert the newly indexed slide into the projector film gate. The sequence is herein referred to as slide or magazine transport.

A control circuit 3 according to one specific embodiment of the invention is provided, which may be housed in a separate unit and connected to each of the projectors 1 and 2 by electronic cable. The control circuit 3 comprises a forward transport button 4, a reverse transport button 5, resistors 41 and 51 and the logic circuit elements as described below which serve to affect a change-over between the on-off condition between the two projection lamps 11 and 21, which will be referred to as the change-over cycle between the projectors, as well as forward or reverse magazine transport. The description of the operation of the control circuit 3 will be presented in terms of computer logic. In such presentation the logic elements of the control circuit 3 are said to have inputs and outputs of a logical ONE or ZERO state. The logical ZERO often refers to a state very close to ground and conversely the logical ONE represents a state at some potential significantly higher than ground. However, this arrangement is purely arbitrary.

The logic network which makes up the control circuit 3 includes a flip-flop 31 which may be of conventional form having a toggled input T and outputs Q and $\overline{Q}$. The vinculum or bar over Q appears as an indication that the logic level at that symbol is the opposite, or the compliment of the logic where the symbol is unaccompanied by the vinculum. The control circuit 3 includes a second flip-flop 33 having inputs designated as S (set) and C (clear), which are received by way of the closure of the forward or reverse transport buttons 4 or 5. The flip-flop 33 also has outputs Q and $\overline{Q}$, however, the $\overline{Q}$ output is open. A third flip-flop 32 receives the outputs Q and $\overline{Q}$ from the flip-flop 31 at its inputs S and C, and provides outputs Q and $\overline{Q}$ and F. The output Q of the flip-flop 33 and the output F of the flip-flop 32 provide inputs to an AND-gate 45. The output of AND-gate 45 provides one of the inputs to AND-gates 43 and 44 while the other input to the AND-gates 43 and 44 are provided from the outputs Q and $\overline{Q}$ of the flip-flop 31. The logic elements thus described furnish the change-over apparatus with sufficient signals such that upon closure of the forward transport button 4 the projectors 1 and 2 are alternately operated during forward magazine transport.

The logic elements of the control 3 which provide for reverse magazine transport between the projectors 1 and 2 includes the flip-flop 31 and a second pair of AND-gates numerically designated as 53 and 54. The AND-gates 53 and 54 receive one of their inputs from the Q and $\overline{Q}$ outputs of the flip-flop 31 and their other input from a potential source by way of the closure of the reverse transport button 5. The outputs of the AND-gates 53 and 54 are coupled respectively to the inputs of the magazine transports 13 and 23 for reverse movement and also have their outputs coupled through switches $S_2$ and $S_1$ to the toggled input T of the flip-flop 31 through feed back diodes 55 and 56 respectively.

The input to the flip-flop 31 which initiates forward magazine transport occurs upon closure of the forward transport button 4 by means of a pulse generator 42 such as may be well known in the art which provides a pulse having finite rise time, width and amplitude.

The projection lamps 11 and 21 are alternately turned off and on in conjunction with the operation of the control circuit 3 as stated previously which will be referred to as the change-over cycle. The duration of the on-off or darkening-lighting phase may be adjusted by a variable resistor 34 connected in the flip-flop 32.

As will be described more fully later, when the lamp of one projector is being turned on for projection, the magazine transport of the other projector is being operated for placing a slide in readiness for change-over. Therefore, when the projectors are set for forward magazine travel, it must be insured that slide transport by magazine transport 12 and 22 does not take place before the projection lamp of the respective projector is completely darkened so that slide replacement will not become visible on the viewing screen (not shown). In order to insure that this condition is fulfilled, the output F of the flip-flop 32 occurs at the end of the change-over cycle, i.e., at the occurrence of the negative going trailing edge of the pulse generated by pulse circuit 42. To avoid the opposite problem when the projectors are set for reverse travel, reverse travel should start with the projector whose lamp is dark so that slide transport may be completed before the lamp is turned on. In order to insure that this condition is fulfilled, reverse magazine travel occurs upon energization of one of the AND-gates 53 or 54, and at the end of the reverse magazine movement a switch either $S_2$ or $S_1$, depending upon which projector is to be operated is opened whereby the feedback path through the diode 55 or 56 is interrupted. The interruption of the feed back path to the toggled input T of the flip-flop 31 produces a change in state of the flip-flop 31 thereby changing the state of the flip-flop 32 and consequently the light of the previously darkened projector lamp is turned on.

The operation of the slide change-over control system will be described hereinafter in its two modes of operation i.e. forward and reverse magazine travel.

Forward Magazine Travel

For purposes of description of the operation of the apparatus assume first that a slide from the projector 1 is being projected i.e., that the projector lamp 11 is on and that the projector lamp 21 is off (dark). In this condition the logic state of the outputs of the elements of the logic network of the control circuit 3 are as follows:

| FF 31 | FF 32 | FF 33 | AND-gates |
|---|---|---|---|
| Q $\overline{Q}$ | Q $\overline{Q}$ F | Q $\overline{Q}$ | 43 44 53 54 |
| 0 1 | 0 1 1 | 1 0 | 0 1 0 0 |

It may also be seen from the logic outputs above that the AND-gate 44 is conductive and the output thereof has driven the magazine transport 22 for forward movement to its stop and a slide has been placed in the film gate (not shown). If the operator now wishes to change-over to the projector 2, the forward transport button 4 is closed and the pulse generator 42 generates a rectangular pulse which is applied through the resistor 41 to the S input of the flip-flop 33 and to the T input of the flip-flop 31. At the end of the rectangular pulse, i.e. when the trailing edge of the rectangular pulse has passed, the flip-flop 31 changes state such that a ONE appears at the Q output and a ZERO appears at the $\overline{Q}$ output. The Q (ONE) and $\overline{Q}$ (ZERO) outputs of the flip-flop 31 are input to the S and C inputs of the flip-flop 32 which accordingly changes the state of the output of the flip-flop 32 such that the Q output becomes ONE and the $\overline{Q}$ becomes ZERO. Consequently the projection lamp 21 is turned on and the projection lamp 11 is turned off. The magazine transport 22 for forward movement having been previously moved to its project position has placed a slide (not shown) in a position to be projected by projection lamp 21 when it comes on. At the same time, the output of the flip-flop 33 being in a ONE state continues to stay in the ONE state upon the passing of the rectangular pulse and the F output of the flip-flop 32 remains at the ONE state which accordingly energizes the AND-gate 45 providing a ONE state at its output and at the input of the AND-gates 43 and 44. The Q output of the flip-flop 31 being in a ONE state provides a second ONE state input to the AND-gate 43 and consequently a ONE state appears at the output of the AND-gate 43. Thus the magazine transport 12 for forward movement is energized and consequently the magazine transport moves to its project position in readiness for the subsequent change-over.

Reverse Magazine Travel

For purposes of explanation during reverse magazine travel it will be assumed that a slide in projector 2 is projected and that the projector lamp 21 is accordingly lit while the projector lamp 11 is dark. In this phase of operation the state of the system is as last described above. If the operator new desires to repeat the projection of the preceding slide in projector 1, he depresses the reverse transport button 5 which causes, on the one hand, a ONE signal to appear at the C input of the flip-flop 33 and a ZERO signal at the output Q as the flip-flop 33 changes state. At the same time a ONE signal appears at one of the inputs of the AND-gates 53 and 54. The other input to the AND-gates 53 and 54 is received from the outputs Q and $\overline{Q}$ of the flip-flop 31 which renders the AND-gate 53 conductive. Accordingly the magazine transport 13 for reverse movement is energized and moves the magazine to its project position. The ONE output from the AND-gate 53 is fed back to the toggled input T of the flip-flop 31 via the diode 55. When the magazine transport 13 for reverse movement reaches the end of its travel the switch $S_2$ is actuated to open the line between the AND-gate 53 and the toggled input T whereby the feed back input is terminated. Therefore, the flip-flop 31 changes its operative state to provide a ZERO output at Q and a ONE output at $\overline{Q}$. The change in state of the flip-flop 31 produces a change in state of the flip-flop 32 whereby the Q output becomes ZERO and the $\overline{Q}$ output becomes ONE. The lamp 11 is accordingly lit and the lamp 21 is turned off. The output F of the flip-flop 32 providing a ONE input to the AND-gate 45 remains at a ONE state. However, the other input to the AND-gate 45, the Q output of the flip-flop 33, is now at a ZERO state and the AND-gate 45 is turned off. The AND-gates 43 and 44 which provide signals for the magazine transports 12 and 22 for forward movement are therefore deenergized.

The control circuit according to the invention as described hereinabove is particularly adapted for use in a change-over arrangement including two projectors and a remote control unit. However, the inventive idea can without difficulty also be realized in a special change-over projector. The limited space usually available in projection apparatus is taken into consideration by the utilization of miniature logical elements.

We claim:

1. For use with two slide projectors, each of the type having actuatable means for effecting forward or reverse slide magazine transport and an actuatable projection lamp, an improved control circuit having means for initiating forward and reverse magazine transport and for selectively controlling actuation of the magazine transport and the sequence in which a change-over of projection by one projection lamp to projection by the other projection lamp occurs in relation to the actuation of magazine transport, said circuit comprising:

first circuit means, including flip-flop circuit means actuatable upon actuation of said forward magazine transport initiating means for providing a signal for effecting said change-over between the projectors, connectable to such projectors and operable to effect alternate forward magazine transport operation of the projectors and to alternately light and darken the projection lamps, said first circuit means being operable during a given operation to effect change over to the projection lamp of one projector before forward magazine transport of said other projector occurs; and second circuit means connectable to such projectors and operable to effect alternate reverse magazine transport operations of the projectors, said second circuit means being operable during a given operation to effect change-over to the projection lamp of one projector after reverse magazine transport of said one projector occurs.

2. A control circuit as recited in claim 1 wherein said first circuit means includes first logic circuit means receiving at least one input from said flip-flop circuit means for providing magazine transport and slide change in one projector from which the change-over is made, after the change-over has been effected.

3. A control circuit as recited in claim 2 including second logic circuit means receiving at least one input from said flip-flop circuit means or from said reverse transport initiating means, said second logic circuit means providing an output coupled to the reverse magazine transport means for energizing the reverse magazine transport.

4. A control circuit as recited in claim 3 wherein said output from said second logic circuit means is coupled to the input of said flip-flop circuit means for providing an input thereof.

5. A control circuit as recited in claim 4 wherein the reverse magazine transport means includes means for interrupting said coupled output at the end of reverse magazine transport so that said flip-flop circuit means are caused to initiate change-over to one projector after reverse magazine transport is effected.

6. A control circuit as recited in claim 5 wherein said means for interrupting said output comprises switch means actuatable by the magazine transport.

7. For use with two slide projectors, each of the type having actuatable means for effecting forward or reverse slide magazine transport and an actuatable projection lamp, an improved control circuit for selectively controlling actuation of each of the magazine transport means and the sequence in which change-over of projection by one projection lamp to projection by the other projection lamp occurs in relation to the actuation of the respective magazine transport, said circuit comprising:

means for initiating forward and reverse magazine transport;

first flip-flop circuit means for providing a signal to effect alternate slide magazine transport;

second flip-flop circuit means for providing a signal in response to initiation of said forward transport means;

third flip-flop circuit means responsive to the signal from said first flip-flop circuit means for providing a signal to effect alternate lighting and darkening of the projection lamps;

first circuit means coupled with all of said flip-flop circuit means and being responsive to operation of said second flip-flop circuit means upon actuation of said forward transport initiating means for initiating forward transport of said one projector after the projection lamp in said one projector has been darkened; and second circuit means responsive to signals from said first and third flip-flop circuit means upon actuation of said reverse transport initiating means for deactivating said forward transport means, and for initiating reverse transport of said other projector, and for darkening said projection lamp of said first projector and for energizing the projection lamp of said other projector after reverse transport of said other projector has been completed.

\* \* \* \* \*